United States Patent

Nakamura et al.

[11] Patent Number: 5,992,949
[45] Date of Patent: Nov. 30, 1999

[54] HYDRAULIC BRAKE CONTROL APPARATUS

[75] Inventors: Kiyoharu Nakamura; Fumiaki Kawahata, both of Toyota; Masayasu Ohkubo, Okazaki; Hirohiko Morikawa, Toyota; Akira Sakai, Toyota; Akihiro Ohtomo, Toyota, all of Japan

[73] Assignee: Toyota Jidosha Kabushiki Kaisha, Aichi-ken, Japan

[21] Appl. No.: 08/886,378

[22] Filed: Jul. 1, 1997

[30] Foreign Application Priority Data

Jul. 5, 1996 [JP] Japan .................................. 8-176840

[51] Int. Cl.$^6$ ........................................ B60T 8/40
[52] U.S. Cl. .............................................. 303/116.1
[58] Field of Search ............................ 303/116.1, 116.2, 303/113.5, 901

[56] References Cited

U.S. PATENT DOCUMENTS 5,560,690  10/1996  Hattori et al. ..................... 303/116.2
5,683,149  11/1997  Aizawa et al. ......................... 303/10
5,727,851   3/1998  Ohkubo et al. ..................... 303/117.1

FOREIGN PATENT DOCUMENTS 4229041   3/1993  Germany .
19512254  10/1996  Germany .
1-278874  11/1989  Japan .

Primary Examiner—Christopher P. Schwartz
Assistant Examiner—Melanie Talavera
Attorney, Agent, or Firm—Kenyon & Kenyon

[57] ABSTRACT

A hydraulic brake control apparatus in which a master cylinder supplies a brake fluid pressure responsive to a brake operating force to wheel cylinders through a first valve, includes a first control unit which controls second valves and third valves when a brake fluid pressure supplied to the wheel cylinders by a pressure supplying device is detected to be excessively high under a condition in which the supply of the brake fluid pressure to the wheel cylinders by the master cylinder is inhibited by the first valve, so that the supply of the brake fluid pressure to the wheel cylinders by the pressure supplying device is inhibited by the second valves and a flow of the brake fluid from the wheel cylinders into a reservoir tank is allowed by the third valves. A second control unit controls the third valves and the first valve at a predetermined time after the flow of the brake fluid from the wheel cylinders into the reservoir tank is allowed, so that the flow of the brake fluid from the wheel cylinders into the reservoir tank is inhibited by the third valves and the supply of the brake fluid pressure to the wheel cylinders by the master cylinder is allowed by the first valve.

10 Claims, 5 Drawing Sheets

HYDRAULIC BRAKE CONTROL APPARATUS

BACKGROUND OF THE INVENTION (1) Field of the Invention

The present invention generally relates to a hydraulic brake control apparatus, and more particularly to a hydraulic brake control apparatus which appropriately controls a brake fluid pressure in a brake system of an automotive vehicle.

(2) Description of the Related Art

A hydraulic brake control apparatus having two pressure supplying devices connected to wheel cylinders of a brake system in an automotive vehicle is known. For example, Japanese Laid-Open Patent Application No.1-278874 discloses this type of apparatus.

In the conventional apparatus of the above-mentioned publication, a master cylinder supplies a brake fluid pressure responsive to a brake operating force, and a pressure supplying device supplies a brake fluid pressure responsive to a drive signal. The pressure supplying device is controlled by the drive signal such that the brake fluid pressure supplied by the pressure supplying device is set at a brake fluid pressure equivalent to the brake operating force multiplied by a predetermined constant.

The conventional apparatus of the above-mentioned publication includes a pressure selection device. The pressure selection device selects a higher one of the pressure supplied by the master cylinder and the pressure supplied by the pressure supplying device when a brake pedal is depressed by the brake operating force by a vehicle operator. The higher pressure selected by the pressure selection device is supplied to the wheel cylinders.

The conventional apparatus of the above-mentioned publication includes a pressure reduction device. The pressure reduction device reduces the brake fluid pressure from the pressure supplying device when the pressure from the pressure supplying device is excessively high. The pressure reduction device supplies a reduced pressure to the pressure selection device for the selection of the brake fluid pressure to be supplied to the wheel cylinders.

According to the conventional apparatus of the above-mentioned publication, it is possible to smoothly increase the brake fluid pressure in the wheel cylinders by selectively using one of the master cylinder and the pressure supplying device after the brake pedal is depressed by the brake operating force. In addition, when the pressure supplied by the pressure supplying device is excessively high due to a defect in the pressure supplying device (this defect will be called the high-pressure defect), the conventional apparatus can prevent the supply of the excessively high pressure by the defective pressure supplying device directly to the wheel cylinders by using the pressure reduction device. Therefore, the conventional apparatus enables the brake system to quickly produce a braking force responsive to the brake operating force by the vehicle operator. Also, the conventional apparatus provides a fail-safe function when the high-pressure defect in the pressure supplying device has occurred.

However, the conventional apparatus of the above-mentioned publication requires the pressure reduction device in order to provide the fail-safe function against the high-pressure defect in the pressure supplying device. The production of the pressure reduction device needs a high cost, and it is difficult for the conventional apparatus of the above-mentioned publication to provide the fail-safe function with a low cost.

If the supply of the brake fluid pressure to the wheel cylinders by the pressure supplying device is inhibited and the supply of the brake fluid pressure to the wheel cylinders by the master cylinder is allowed when the high-pressure defect in the pressure supplying device has occurred, it is possible to control the brake fluid pressure in the wheel cylinders to be equal to the brake fluid pressure from the master cylinder. By taking this method, it is possible to prevent the brake fluid pressure in the wheel cylinders from being increased to the excessively high pressure due to the high-pressure defect.

A flow control device which carries out the above-mentioned method can be manufactured with a cost lower than the cost of the pressure reduction device. By using the flow control device, the fail-safe function against the high-pressure defect may be provided with a low cost.

However, when the high-pressure defect in the pressure supplying device has occurred, the brake fluid pressure in the wheel cylinders at that time is higher than the brake fluid pressure in the master cylinder. If the supply of the brake fluid pressure by the pressure supplying device is simply changed to the supply of the brake fluid pressure by the master cylinder when the high-pressure defect has occurred, the high-pressure brake fluid from the wheel cylinders may be returned back to the master cylinder. It is difficult to avoid the counter flow of the brake fluid into the master cylinder even when the above method is utilized, and the counter flow of the brake fluid into the master cylinder is detrimental to the durability of the master cylinder.

Accordingly, the above method which changes the supply of the brake fluid pressure by the pressure supplying device to the supply of the brake fluid pressure by the master cylinder when the high-pressure defect in the pressure supplying device has occurred, is not necessarily appropriate to provide the fail-safe function against the high-pressure defect. It is difficult for the above method to assure the durability of the master cylinder and provide the fail-safe function against the high-pressure defect.

SUMMARY OF THE INVENTION

An object of the present invention is to provide an improved hydraulic brake control apparatus in which the above-described problems are eliminated.

Another object of the present invention is to provide a hydraulic brake control apparatus which provides the fail-safe function against the high-pressure defect with a low cost and assures the durability of the master cylinder.

The above-mentioned objects of the present invention are achieved by a hydraulic brake control apparatus in which a master cylinder supplies a brake fluid pressure responsive to a brake operating force to wheel cylinders through a first valve, a pressure supplying device supplies a brake fluid pressure responsive to a drive signal to the wheel cylinders through second valves, and the wheel cylinders are connected to a reservoir tank via third valves, the apparatus comprising: a first control unit which controls the second valves and the third valves when the brake fluid pressure supplied to the wheel cylinders by the pressure supplying device is detected to be excessively high under a condition in which the supply of the brake fluid pressure to the wheel cylinders by the master cylinder is inhibited by the first valve, so that the supply of the brake fluid pressure to the wheel cylinders by the pressure supplying device is inhibited by the second valves and a flow of the brake fluid from the wheel cylinders into the reservoir tank is allowed by the third valves; and a second control unit which controls the third valves and the first valve at a predetermined time after the flow of the brake fluid from the wheel cylinders into the reservoir tank is allowed, so that the flow of the brake fluid from the wheel cylinders into the reservoir tank is inhibited by the third valves and the supply of the brake fluid pressure to the wheel cylinders by the master cylinder is allowed by the first valve.

In the hydraulic brake control apparatus of the present invention, when the high-pressure defect in the pressure supplying device has occurred, the supply of the brake fluid pressure to the wheel cylinders by the pressure supplying device is changed to the supply of the brake fluid pressure to the wheel cylinders by the master cylinder without producing the counter flow of the brake fluid into the master cylinder. Therefore, according to the hydraulic brake control apparatus of the present invention, it is possible to provide the fail-safe function against the high-pressure defect in the pressure supplying device and assure the durability of the master cylinder.

In addition, according to the hydraulic brake control apparatus of the present invention, it is possible to effectively prevent the reduction of the braking force on the vehicle wheels by the wheel cylinders in the course of the change from the supply of the brake fluid pressure by the pressure supplying device to the supply of the brake fluid pressure by the master cylinder upon occurrence of the high-pressure defect in the pressure supplying device. Therefore, the hydraulic brake control apparatus of the present invention enables the brake system to maintain an adequately great brake force on the vehicle wheels even when the high-pressure defect in the pressure supplying device has occurred.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
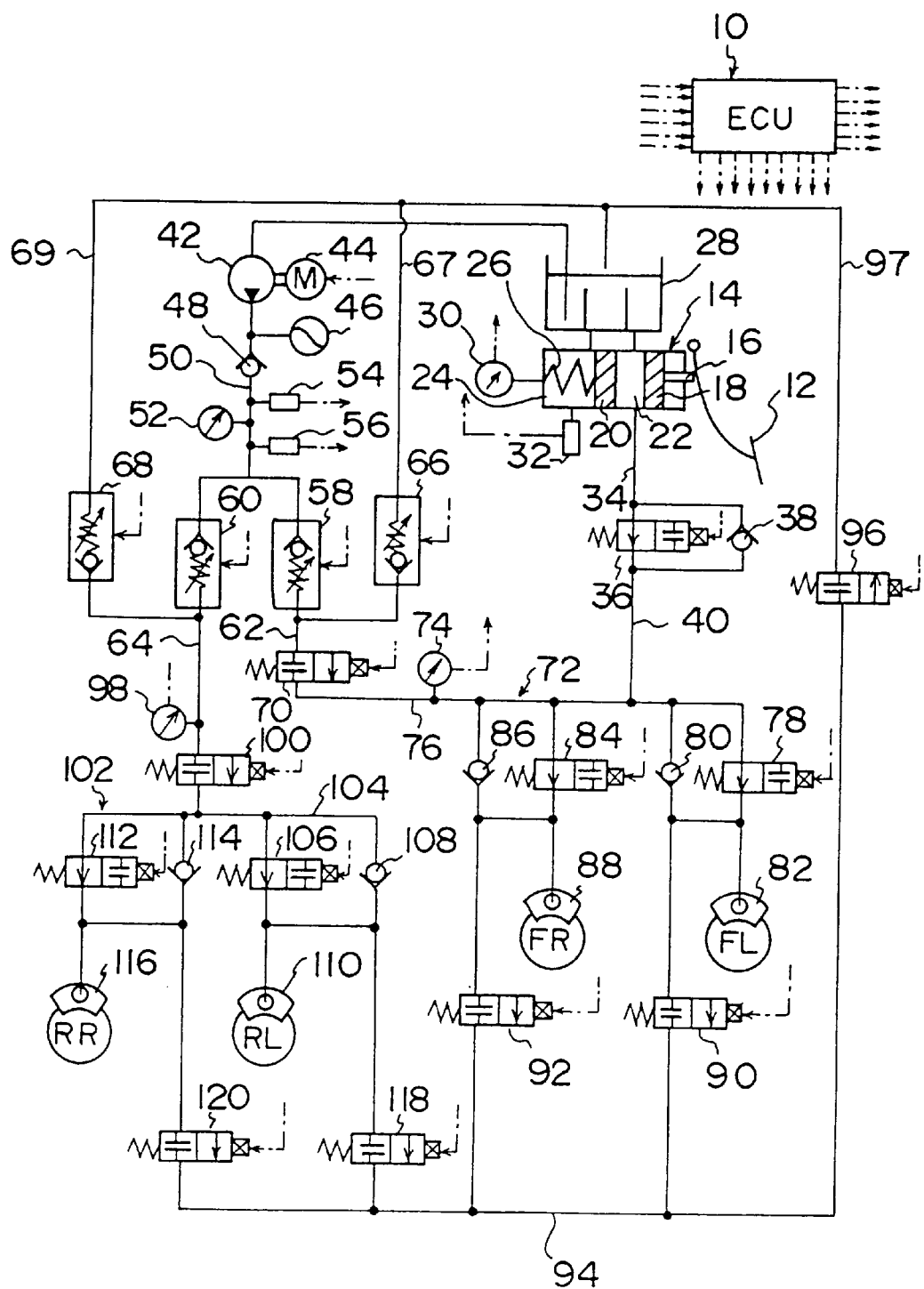
FIG. 1 is a diagram of a brake system to which the hydraulic brake control apparatus of the present invention is applied.

FIG. 1 shows a brake system to which a hydraulic brake control apparatus of the present invention is applied.

As shown in FIG. 1, the brake system is used in an automotive vehicle and includes an electronic control unit (ECU) 10. The electronic control unit 10 controls the elements of the brake system in accordance with the operating conditions of the vehicle. Hereinafter, the electronic control unit 10 will be called the ECU 10.

In FIG. 1, input signal paths over which signals from the elements of the brake system are sent to the ECU 10, and output signal paths over which signals from the ECU 10 are sent to the elements of the brake system are omitted for the sake of convenience. Unless otherwise specified, these signal paths are indicated by dotted-line arrows in FIG. 1, and brake fluid paths on which brake fluid is supplied between the elements of the brake system are indicated by solid lines in FIG. 1.

The brake system comprises a brake pedal 12. The brake pedal 12 is connected to an input shaft 16 of a master cylinder 14.

The master cylinder 14 includes a first piston 18 and a second piston 20 which are provided in the master cylinder 14. The first piston 18 is connected to the input shaft 16 via a front surface of the master cylinder 14. In the master cylinder 14, a first pressure chamber 22 between the first piston 18 and the second piston 20 is provided, and a second pressure chamber 24 between the second piston 20 and a rear surface of the master cylinder 14 is provided. In the second pressure chamber 24, a spring 26 is provided, and the spring 26 exerts an actuating force on the second piston 20 to push the second piston 20 toward the brake pedal 12.

When the brake pedal 12 is set at an original position (or the brake pedal 12 is not depressed by the vehicle operator), the first piston 18 and the second piston 20 in the master cylinder 14 are set at starting positions. When the brake pedal 12 is set at an operated position (or the brake pedal 12 is depressed by the vehicle operator) and then released, the first piston 18 and the second piston 20 are returned to the starting positions.

A reservoir tank 28 is provided above the master cylinder 14. The reservoir tank 28 contains a brake fluid stored therein. The reservoir tank 28 is connected to both the first pressure chamber 22 and the second pressure chamber 24 only when the first piston 18 and the second piston 20 are set at the starting positions in the master cylinder 14. Otherwise the reservoir tank 28 is disconnected from the master cylinder 14. Therefore, the brake fluid in the reservoir tank 28 is replenished to both the first pressure chamber 22 and the second pressure chamber 24 of the master cylinder 14 each time the brake pedal 12 is released by the vehicle operator or set at the original position.

A master cylinder pressure sensor 30 (which will be called the Pmc sensor 30) and a pressure switch 32 are provided in the second pressure chamber 24 of the master cylinder 14.

The Pmc sensor 30 outputs a signal indicative of a brake fluid pressure in the second pressure chamber 24 of the master cylinder 14. The signal output from the Pmc sensor 30 is supplied to the ECU 10. The ECU 10 detects a master cylinder pressure Pmc (which will be called the pressure Pmc) based on the signal from the Pmc sensor 30.

The pressure switch 32 outputs an ON signal when the brake fluid pressure in the master cylinder 14 is higher than a reference level. The ON signal from the pressure switch 32 is supplied to the ECU 10. The ECU 10 detects whether the brake pedal 12 is set at the operated position (or whether it is depressed by the vehicle operator), based on whether the ON signal from the pressure switch 32 is supplied to the ECU 10.

A pressure passage 34 is connected at one end to the first pressure chamber 22 of the master cylinder 14. The pressure passage 34 is connected at the other end to a pressure passage 40 via a master cylinder cut valve 36 (which will be called the MCV 36). In addition, the pressure passage 34 is connected to the pressure passage 40 via a bypass passage in which a check valve 38 is provided.

The MCV 36 is an electromagnetic flow control valve which is electrically set at one of an opened position and a closed position. When a drive signal from the ECU 10 is not supplied to the MCV 36, the MCV 36 is always at the opened position so that the brake fluid from the master cylinder 14 is allowed to flow into the pressure passage 40 via the MCV 36. When the drive signal from the ECU 10 is supplied to the MCV 36, the MCV 36 is electrically set at the closed position, so that a flow of the brake fluid from the master cylinder 14 into the pressure passage 40 via the MCV 36 is inhibited.

The check valve 38 is a type of valve which allows a flow of fluid in one direction only. The check valve 38 allows the flow of the brake fluid from the pressure passage 34 to the pressure passage 40 via the bypass passage. The check valve 38 inhibits the flow of the brake fluid in the opposite direction.

The brake system comprises a pump 42. The pump 42 is provided with an actuating motor 44. The actuating motor 44 actuates the pump 42 so that the pump 42 supplies a high-pressure brake fluid. The operation of the motor 44 is controlled by the ECU 10. An inlet port of the pump 42 is connected to the reservoir tank 28. An outlet port of the pump 42 is connected to a high-pressure passage 50 via a check valve 48. An accumulator 46 is provided between the outlet port of the pump 42 and the check valve 48, and the accumulator 46 and the pump 42 connected to each other.

An accumulator pressure sensor 52 (which will be called the Pacc sensor 52) is connected to the high-pressure passage 50. The Pacc sensor 52 outputs a signal indicative of a brake fluid pressure in the high-pressure passage 50. The signal output from the Pacc sensor 52 is supplied to the ECU 10. The ECU 10 detects the brake fluid pressure in the high-pressure passage 50 based on the signal from the Pacc sensor 52. An accumulator pressure Pacc (which will be called the pressure Pacc) in the accumulator 46 is equivalent to the brake fluid pressure in the high-pressure passage 50. That is, the ECU 10 detects the present level of the pressure Pacc in the accumulator 46 based on the signal from the Pacc sensor 52.

An upper-limit sensor 54 and a lower-limit sensor 56 are connected to the high-pressure passage 50 at positions adjacent to the Pacc sensor 52. The upper-limit sensor 54 outputs an ON signal when the brake fluid pressure (or the pressure Pacc) in the high-pressure passage 50 is higher than an upper limit of a predetermined operating pressure range of the pressures Pacc for the accumulator 46. The lower-limit sensor 56 outputs an ON signal when the brake fluid pressure in the high-pressure passage 50 is lower than a lower limit of the predetermined operating pressure range of the pressures Pacc for the accumulator 46. Both the signal from the upper-limit sensor 54 and the signal from the lower-limit sensor 56 are supplied to the ECU 10.

When the lower-limit sensor 56 outputs an ON signal to the ECU 10, the ECU 10 supplies a drive signal to the motor 44 so that the pump 42 is actuated by the motor 44. The ECU 10 continues to supply the drive signal to the motor 44 until the upper-limit sensor 54 outputs an ON signal to the ECU 10. According to this operation, the pressure Pacc in the accumulator 46 is always maintained to be in the predetermined operating pressure range.

A pressure-up linear valve 58 and a pressure-up linear valve 60 are connected to the high-pressure passage 50 at the end of the high-pressure passage 50. The pressure-up linear valve 58 is connected at the other end to a front pressure passage 62, and the pressure-up linear valve 60 is connected at the other end to a rear pressure passage 64.

The front pressure passage 62 is connected to the reservoir tank 28 via a first return passage 67 in which a pressure-down linear valve 66 is provided. The rear pressure passage 64 is connected to the reservoir tank 28 via a second return passage 69 in which a pressure-down linear valve 68 is provided.

When drive signals are not supplied by the ECU 10, the pressure-up linear valves 58 and 60 and the pressure-down linear valves 66 and 68 are set at the closed positions. When the drive signals are supplied by the ECU 10, the pressure-up linear valves 58 and 60 and the pressure-down linear valves 66 and 68 are set at the opened positions. When one of the four linear valves 58, 60, 66 and 68 is set at the opened position, an effective valve-opening area in a corresponding one of the passages 62, 64, 67 and 69 is formed by the related linear valve. The effective valve-opening area formed by the related linear valve varies in proportion to the level of the drive signal supplied by the ECU 10.

Therefore, in the above-described hydraulic brake control apparatus, by changing the level of the drive signal supplied to the pressure-up linear valve 58, a pressure of the brake fluid fed from the high-pressure passage 50 into the front pressure passage 62 can be controlled such that the brake fluid pressure is linearly changed. By changing the level of the drive signal supplied to the pressure-down linear valve 66, a pressure of the brake fluid fed from the front pressure passage 62 into the reservoir tank 28 can be controlled such that the brake fluid pressure is linearly changed. By changing the level of the drive signal supplied to the pressure-up linear valve 60, a pressure of the brake fluid fed from the high-pressure passage 50 into the rear pressure passage 64 can be controlled such that the brake fluid pressure is linearly changed. By changing the level of the drive signal supplied to the pressure-down linear valve 68, a pressure of the brake fluid fed from the rear pressure passage 64 into the reservoir tank 28 can be controlled such that the brake fluid pressure is linearly changed.

A front cut valve 70 (which will be called the FCV 70) is connected to the front pressure passage 62 at the end of the front pressure passage 62. The FCV 70 is connected at the other end to a front hydraulic circuit 72.

The FCV 70 is an electromagnetic flow control valve which is set at one of an opened position and a closed position. When a drive signal from the ECU 10 is not supplied to the FCV 70, the FCV 70 is always at the closed position so that a flow of the brake fluid from the front pressure passage 62 into the front hydraulic circuit 72 via the FCV 70 is inhibited. When the drive signal from the ECU 10 is supplied to the FCV 70, the FCV 70 is electrically set at the opened position, so that the brake fluid from the front pressure passage 62 is allowed to flow into the front hydraulic circuit 72 via the FCV 70.

In addition, the pressure passage 40 is connected to the front hydraulic circuit 72 via a connection passage 76. When the MCV 36 is set at the opened position, the master cylinder 14 and the front hydraulic circuit 72 are connected to each other via the pressure passage 40. In this condition, the brake fluid whose pressure is equal to the pressure Pmc is supplied from the master cylinder 14 to the front hydraulic circuit 72.

When the MCV 36 is set at the closed position, the master cylinder 14 and the front hydraulic circuit 72 are connected to each other via the bypass passage in which the check valve 38 is provided. In this condition, if the pressure Pmc is higher than a brake fluid pressure in the front hydraulic circuit 72, the brake fluid pressure in the front hydraulic circuit 72 is increased to the pressure Pmc. This brake fluid pressure will be equal to the pressure Pmc. If the pressure Pmc is lower than the brake fluid pressure in the front hydraulic circuit 72, the brake fluid pressure in the front hydraulic circuit 72 is retained at the same level. This brake fluid pressure is different from the pressure Pmc.

A front wheel cylinder pressure sensor 74 (which will be called the Pf sensor 74) is connected to the connection passage 76 which interconnects the FCV 70 and the front hydraulic circuit 72. The Pf sensor 74 communicates with the pressure passage 40 via the connection passage 76. The Pf sensor 74 outputs a signal indicative of a brake fluid pressure in the connection passage 76. The signal output from the Pf sensor 74 is supplied to the ECU 10. The ECU 10 detects the present level of the brake fluid pressure in the connection passage 76 based on the signal from the Pf sensor 74.

The front hydraulic circuit 72 includes a pressure hold valve 78 and a check valve 80 which are provided in parallel. The pressure hold valve 78 and the check valve 80 are connected to a wheel cylinder 82 provided for a front left ("FL") wheel of the vehicle. The connection passage 76 is connected to the wheel cylinder 82 via the pressure hold valve 78 and the check valve 80.

The check valve 80 allows the flow of the brake fluid from the wheel cylinder 82 to the connection passage 76. The check valve 80 inhibits the flow of the brake fluid from the connection passage 76 to the wheel cylinder 82. The pressure hold valve 78 is an electromagnetic flow control valve which is set at one of an opened position and a closed position. When a drive signal from the ECU 10 is not supplied to the pressure hold valve 78, the pressure hold valve 78 is always at the opened position so that the brake fluid from the connection passage 76 is allowed to flow into the wheel cylinder 82 via the pressure hold valve 78. When the drive signal from the ECU 10 is supplied to the pressure hold valve 78, the pressure hold valve 78 is electrically set at the closed position, so that the flow of the brake fluid from the connection passage 76 to the wheel cylinder 82 via the pressure hold valve 78 is inhibited.

The front hydraulic circuit 72 includes a pressure hold valve 84 and a check valve 86 which are provided in parallel. The pressure hold valve 84 and the check valve 86 are connected to a wheel cylinder 88 provided for a front right ("FR") wheel of the vehicle. The connection passage 76 is connected to the wheel cylinder 88 via the pressure hold valve 84 and the check valve 86.

The check valve 86 allows the flow of the brake fluid from the wheel cylinder 88 to the connection passage 76. The check valve 86 inhibits the flow of the brake fluid from the connection passage 76 to the wheel cylinder 88. The pressure hold valve 84 is an electromagnetic flow control valve which is set at one of an opened position and a closed position. When a drive signal from the ECU 10 is not supplied to the pressure hold valve 84, the pressure hold valve 84 is always at the opened position so that the brake fluid from the connection passage 76 is allowed to flow into the wheel cylinder 88 via the pressure hold valve 84. When the drive signal from the ECU 10 is supplied to the pressure hold valve 84, the pressure hold valve 84 is electrically set at the closed position, so that the flow of the brake fluid from the connection passage 76 to the wheel cylinder 88 via the pressure hold valve 84 is inhibited.

The wheel cylinder 82 is connected to a low-pressure passage 94 via a pressure-down valve 90, and the wheel cylinder 88 is connected to the low-pressure passage 94 via a pressure-down valve 92. Each of the pressure-down valves 90 and 92 is an electromagnetic flow control valve which is electrically set at one of an opened position and a closed position. When signals from the ECU 10 are not supplied, the pressure-down valves 90 and 92 are always at the closed positions, so that the flow of the brake fluid from the wheel cylinders 82 and 88 into the low-pressure passage 94 via the pressure-down valves 90 and 92 is inhibited. When signals from the ECU 10 are supplied, the pressure-down valves 90 and 92 are set at the opened positions, so that the flow of the brake fluid from the wheel cylinders 82 and 88 into the low-pressure passage 94 via the pressure-down valves 90 and 92 is allowed.

A reservoir cut valve 96 (which will be called the RVCV 96) is connected to the low-pressure passage 94 at the end of the low-pressure passage 94. The RVCV 96 is connected at the other end to the reservoir tank 28 via a return passage 97. The RVCV 96 is an electromagnetic flow control valve which is electrically set at one of an opened position and a closed position. When a drive signal from the ECU 10 is not supplied, the RVCV 96 is always at the closed position so that the flow of the brake fluid from the low-pressure passage 94 into the reservoir tank 28 via the RVCV 96 is inhibited. When the drive signal from the ECU 10 is supplied, the RVCV 96 is set at the opened position, so that the brake fluid from the low-pressure passage 94 is allowed to flow into the reservoir tank 28 via the RVCV 96.

A rear wheel cylinder pressure sensor 98 (which will be called the Pr sensor 98) is connected to the rear pressure passage 64. The Pr sensor 98 outputs a signal indicative of a brake fluid pressure in the rear pressure passage 64. The signal output from the Pr sensor 98 is supplied to the ECU 10. The ECU 10 detects the present level of the brake fluid pressure in the rear pressure passage 64 based on the signal from the Pr sensor 98.

A rear cut valve 100 (which will be called the RCV 100) is connected to the rear pressure passage 64 at the end of the rear pressure passage 64. The RCV 100 is connected at the other end to a rear hydraulic circuit 102 via a connection passage 104.

The RCV 100 is an electromagnetic flow control valve which is electrically set at one of an opened position and a closed position. When a drive signal from the ECU 10 is not supplied to the RCV 100, the RCV 100 is always at the closed position so that the flow of the brake fluid from the rear pressure passage 64 into the rear hydraulic circuit 102 via the RCV 100 is inhibited. When the drive signal from the ECU 10 is supplied to the RCV 100, the RCV 100 is electrically set at the opened position, so that the brake fluid from the rear pressure passage 64 is allowed to flow into the rear hydraulic circuit 102 via the RCV 100.

The rear hydraulic circuit 102 includes a pressure hold valve 106 and a check valve 108 which are provided in parallel. The pressure hold valve 106 and the check valve 108 are connected to a wheel cylinder 110 provided for a rear left ("RL") wheel of the vehicle. The connection passage 104 is connected to the wheel cylinder 110 via the pressure hold valve 106 and the check valve 108.

The check valve 108 allows the flow of the brake fluid from the wheel cylinder 110 to the connection passage 104. The check valve 108 inhibits the flow of the brake fluid from the connection passage 104 to the wheel cylinder 110. The pressure hold valve 106 is an electromagnetic flow control valve which is electrically set at one of an opened position and a closed position. When a drive signal from the ECU 10 is not supplied to the pressure hold valve 106, the pressure hold valve 106 is always at the opened position so that the brake fluid from the connection passage 104 is allowed to flow into the wheel cylinder 110 via the pressure hold valve 106. When the drive signal from the ECU 10 is supplied to the pressure hold valve 106, the pressure hold valve 106 is electrically set at the closed position, so that the flow of the brake fluid from the connection passage 104 to the wheel cylinder 110 via the pressure hold valve 106 is inhibited.

The rear hydraulic circuit 102 includes a pressure hold valve 112 and a check valve 114 which are provided in parallel. The pressure hold valve 112 and the check valve 114 are connected to a wheel cylinder 116 provided for a rear right ("RR") wheel of the vehicle. The connection passage 104 is connected to the wheel cylinder 116 via the pressure hold valve 112 and the check valve 114.

The check valve 114 allows the flow of the brake fluid from the wheel cylinder 116 to the connection passage 104. The check valve 114 inhibits the flow of the brake fluid from the connection passage 104 to the wheel cylinder 116. The pressure hold valve 112 is an electromagnetic flow control valve which is electrically set at one of an opened position and a closed position. When a drive signal from the ECU 10 is not supplied to the pressure hold valve 112, the pressure hold valve 112 is always at the opened position so that the brake fluid from the connection passage 104 is allowed to flow into the wheel cylinder 116 via the pressure hold valve 112. When the drive signal from the ECU 10 is supplied to the pressure hold valve 112, the pressure hold valve 112 is electrically set at the closed position, so that the flow of the brake fluid from the connection passage 104 to the wheel cylinder 116 via the pressure hold valve 112 is inhibited.

The wheel cylinder 110 is connected to the low-pressure passage 94 via a pressure-down valve 118, and the wheel cylinder 116 is connected to the low-pressure passage 94 via a pressure-down valve 120. Each of the pressure-down valves 118 and 120 is an electromagnetic flow control valve which is electrically set at one of an opened position and a closed position. When signals from the ECU 10 are not supplied, the pressure-down valves 118 and 120 are always at the closed positions, so that the flow of the brake fluid from the wheel cylinders 110 and 116 into the low-pressure passage 94 via the pressure-down valves 118 and 120 is inhibited. When signals from the ECU 10 are supplied, the pressure-down valves 118 and 120 are set at the opened positions, so that the flow of the brake fluid from the wheel cylinders 110 and 116 into the low-pressure passage 94 via the pressure-down valves 118 and 120 is allowed.

In the brake system of FIG. 1, when a brake operating force Fp by the vehicle operator is placed onto the brake pedal 12, the brake fluid pressure in the first pressure chamber 22 and the brake fluid pressure in the second pressure chamber 24 are increased in response to the brake operating force Fp on the brake pedal 12.

When the brake fluid pressure in the second pressure chamber 24 of the master cylinder 14 is higher than the reference level, the pressure switch 32 outputs an ON signal to the ECU 10. The ECU 10 detects that the brake pedal 12 is set at the operated position or depressed by the vehicle operator, based on the ON signal from the pressure switch 32.

When the depression of the brake pedal 12 by the vehicle operator is detected, the ECU 10 supplies signals to the MCV 36, the FCV 70 and the RCV 10, so that the MCV 36 is set at the closed position, and the FCV 70 and the RCV 100 are set at the opened positions.

In this case, the flow of the brake fluid from the master cylinder 14 into the pressure passage 40 via the MCV 36 is inhibited. The brake fluid from the front pressure passage 62 is allowed to flow into the front hydraulic circuit 72 via the FCV 70. The pressure of the brake fluid supplied from the FCV 70 is adjusted to a pressure Pf by the pressure-up linear valve 58 and the pressure-down linear valve 66, and these linear valves 58 and 66 will be called the front linear valves 58 and 66. Further, the brake fluid from the rear pressure passage 64 is allowed to flow into the rear hydraulic circuit 102 via the RCV 100. The pressure of the brake fluid supplied from the RCV 100 is adjusted to a brake fluid pressure Pr by the pressure-up linear valve 60 and the pressure-down linear valve 68, and these linear valves 60 and 68 will be called the rear linear valves 60 and 68.

Under such conditions, the Pmc sensor 30 outputs a signal indicative of the pressure Pmc in the master cylinder 14 in response to the brake operating force Fp. The Pf sensor 74 outputs a signal indicative of the pressure Pf in the connection passage 76, the pressure Pf being adjusted by the front linear valves 58 and 66. The Pr sensor 98 outputs a signal indicative of the pressure Pr in the rear pressure passage 64 or the connection passage 104, the pressure Pr being adjusted by the rear linear valves 60 and 68.

Based on the signals from the Pmc sensor 30 and the Pf sensor 74, the ECU 10 controls the front linear valves 58 and 66 such that a brake fluid pressure Pf is supplied by the front linear valves 58 and 66 and a ratio of the pressure Pf to the pressure Pmc is set at a predetermined constant. Based on the signals from the Pmc sensor 30 and the Pr sensor 98, the ECU 10 controls the rear linear valves 60 and 68 such that a brake fluid pressure Pr is supplied by the rear linear valves 60 and 68 and a ratio of the pressure Pr to the pressure Pmc is set at a predetermined constant.

When a hydraulic brake control process is not performed by the hydraulic brake control apparatus, the pressure hold valves 78 and 84 are set at the opened positions and the pressure-down valves 90 and 92 are set at the closed positions. Under such conditions, the brake fluid pressure Pf in the connection passage 76 of the front hydraulic circuit 72 is supplied to the front wheel cylinders 82 and 88. The brake fluid pressure Pf in the front wheel cylinders 82 and 88 is adjusted such that a ratio of the pressure Pf to the master cylinder pressure Pmc (which varies in response to the brake operating force Fp) is set at a predetermined constant.

Similarly, when the hydraulic brake control process is not performed by the hydraulic brake control apparatus, the pressure hold valves 106 and 112 are set at the opened positions and the pressure-down valves 118 and 120 are set at the closed positions. Under such conditions, the brake fluid pressure Pr in the connection passage 104 of the rear hydraulic circuit 102 is supplied to the rear wheel cylinders 110 and 116. The brake fluid pressure Pr in the rear wheel cylinders 110 and 116 is adjusted such that a ratio of the pressure Pr to the master cylinder pressure Pmc (which varies in response to the brake operating force Fp) is set at a predetermined constant.

Accordingly, in the brake system of FIG. 1, it is possible to adjust the pressure Pf in the front wheel cylinders 82 and 88 and the pressure Pr in the rear wheel cylinders 110 and 116 such that the pressure Pf and the pressure Pr are set at predetermined values in response to the brake operating force Fp. A control procedure in which the above-described function is achieved by the brake system when the hydraulic brake control process is not performed will be called a normal control mode.

In the hydraulic brake control apparatus of the above-described embodiment, the front linear valves 58 and 66 can be controlled such that the ratio of the pressure Pf to the pressure Pmc is set at a predetermined constant which is varied independently of the pressure Pmc in the master cylinder 14, and the rear linear valves 60 and 68 can be controlled such that the ratio of the pressure Pr to the pressure Pmc is set at a predetermined constant which is varied independently of the pressure Pmc in the master cylinder 14. The pressure Pf from the front linear valves 58 and 66 is supplied to the connection passage 76 of the front hydraulic circuit 72 via the FCV 70, and the pressure Pr from the rear linear valves 60 and 68 is supplied to the connection passage 114 of the rear hydraulic circuit 102 via the RCV 100.

Therefore, in the hydraulic brake control apparatus of the above-described embodiment, the pressure Pf in the front wheel cylinders 82 and 88 can be suitably increased by controlling the front linear valves 58 and 66, and the pressure Pr in the rear wheel cylinders 110 and 116 can be suitably increased by controlling the rear linear valves 60 and 68. A control procedure in which the above-described function is achieved by the hydraulic brake control apparatus of the present embodiment will be called a pressure-increase control mode.

Further, in the hydraulic brake control apparatus of the above-described embodiment, when the pressure hold valve 78 is set at the closed position and the pressure-down valve 90 is set at the closed position, it is possible to continuously hold the pressure Pf in the wheel cylinder 82 at the same level. When the pressure hold valve 84 is set at the closed position and the pressure-down valve 92 is set at the closed position, it is possible to hold the pressure Pf in the wheel cylinder 88 at the same level. When the pressure hold valve 106 is set at the closed position and the pressure-down valve 118 is set at the closed position, it is possible to continuously hold the pressure Pr in the wheel cylinder 110 at the same level. When the pressure hold valve 112 is set at the closed position and the pressure-down valve 120 is set at the closed position, it is possible to continuously hold the pressure Pr in the wheel cylinder 116 at the same level.

Therefore, in the hydraulic brake control apparatus of the above-described embodiment, the pressure Pf in the front wheel cylinders 82 and 88 can be maintained at a desired level by controlling the pressure hold valves 78 and 84 and the pressure-down valves 90 and 92, and the pressure Pr in the rear wheel cylinders 110 and 116 can be maintained at a desired level by controlling the pressure hold valves 106 and 112 and the pressure-down valves 118 and 120. A control procedure in which the above-described function is achieved by the hydraulic brake control apparatus of the present embodiment will be called a pressure hold control mode.

Further, in the hydraulic brake control apparatus of the above-described embodiment, when the pressure hold valve 78 is set at the closed position and the pressure-down valve 90 and the RVCV 96 are set at the opened positions, it is possible to suitably reduce the pressure Pf in the wheel cylinder 82. When the pressure hold valve 84 is set at the closed position and the pressure-down valve 92 and the RVCV 96 are set at the opened positions, it is possible to suitably reduce the pressure Pf in the wheel cylinder 88. When the pressure hold valve 106 is set at the closed position and the pressure-down valve 118 and the RVCV 96 are set at the opened positions, it is possible to suitably reduce the pressure Pr in the wheel cylinder 110. When the pressure hold valve 112 is set at the closed position and the pressure-down valve 120 and the RVCV 96 are set at the closed positions, it is possible to suitably reduce the pressure Pr in the wheel cylinder 116.

Therefore, in the hydraulic brake control apparatus of the present embodiment, the pressure Pf in the front wheel cylinders 82 and 88 can be suitably reduced by controlling the pressure hold valves 78 and 84, the RVCV 96 and the pressure-down valves 90 and 92, and the pressure Pr in the rear wheel cylinders 110 and 116 can be suitably reduced by controlling the pressure hold valves 106 and 112, the RVCV 96 and the pressure-down valves 118 and 120. A control procedure in which the above-described function is achieved by the hydraulic brake control apparatus of the present embodiment will be called a pressure-decrease control mode.

The ECU 10 suitably carries out one of the normal control mode, the pressure-increase control mode, the pressure hold control mode and the pressure-decrease control mode of the brake system based on the operating conditions of the vehicle and the respective slip ratios of the FL, FR, RL and RR wheels of the vehicle. The normal control mode is carried out in order to achieve a hydraulic brake control function responsive to the brake operating force of the vehicle operator. The pressure-increase control mode, the pressure hold control mode and the pressure-decrease control mode in combination are carried out in order to achieve a hydraulic brake control function appropriate to ensure a vehicle running stability.

In the hydraulic brake control apparatus of the above-described embodiment, if a defect in the front linear valves 58 and 66 has occurred, the pressure Pf in the front wheel cylinders 82 and 88 cannot be increased to an adequately high pressure due to an excessively low pressure of the brake fluid supplied from the defective front linear valves 58 and 66. This defect will be called the low-pressure defect. Further, in the hydraulic brake control apparatus of the above-described embodiment, if another type of defect in the front linear valves 58 and 66 has occurred, the pressure Pf in the front wheel cylinders 82 and 88 cannot suitably be maintained at the adequate pressure due to an excessively high brake fluid pressure supplied from the defective front linear valves 58 and 66. This defect will be called the high-pressure defect.

In order to avoid the above problem, in the hydraulic brake control apparatus of the above-described embodiment, when the occurrence of the low-pressure defect or the high-pressure defect in the front linear valves 58 and 66 is detected, the ECU 10 sets the MCV 36 at the opened position and sets the FCV 70 at the closed position. The pressure Pf in the front wheel cylinders 82 and 88 can be increased to or maintained at the adequate pressure by supplying the brake fluid pressure Pmc from the master cylinder 14 to the front hydraulic circuit 72 through the MCV 36 instead of the supply of the brake fluid pressure from the defective linear valves 58 and 66.

Therefore, in the hydraulic brake control apparatus of the above-described embodiment, when the occurrence of the low-pressure defect or the high-pressure defect in the front linear valves 58 and 66 is detected, it is possible to supply the brake fluid pressure Pmc from the master cylinder 14, which pressure is responsive to the brake operating force Fp, to the wheel cylinders 82 and 88. Therefore, it is possible that the hydraulic brake control apparatus of the above-described embodiment safely produce an adequately great braking force on the front wheels of the vehicle, and the braking force thus produced is responsive to the brake operating force Fp even when the low-pressure defect or the high-pressure defect in the front linear valves 58 and 66 has occurred.

When the high-pressure defect in the front linear valves 58 and 66 has occurred, the brake fluid pressure Pf in the wheel cylinders 82 and 88 at that time is higher than the brake fluid pressure Pmc in the master cylinder 14. If the supply of the brake fluid pressure to the wheel cylinders 82 and 88 by the front linear valves 58 and 66 is changed to the supply of the brake fluid pressure to the wheel cylinders 82 and 88 by the master cylinder 14 after the high-pressure defect has occurred, the high-pressure brake fluid Pf from the wheel cylinders 82 and 88 may be returned back to the master cylinder 14 through the MCV 36. This counter flow of the brake fluid is detrimental to the durability of the master cylinder 14.

In order to assure the durability of the master cylinder 14, it is desirable to avoid the counter flow of the brake fluid into the master cylinder 14 when the high-pressure defect in the front linear valves 58 and 66 has occurred. In the hydraulic brake control apparatus of the present embodiment, when the occurrence of the high-pressure defect in the front linear valves 58 and 66 is detected, the supply of the brake fluid pressure to the wheel cylinders 82 and 88 by the front linear valves 58 and 66 is changed to the supply of the brake fluid pressure to the wheel cylinders 82 and 88 by the master cylinder 14, and, at the same time, the above counter flow of the brake fluid into the master cylinder 14 is avoided.

The above-mentioned function of the hydraulic brake control apparatus of the present embodiment is achieved by carrying out a hydraulic brake control routine by means of the ECU 10 of the brake system of FIG. 1, which will be described in the following.

Figure 2A:
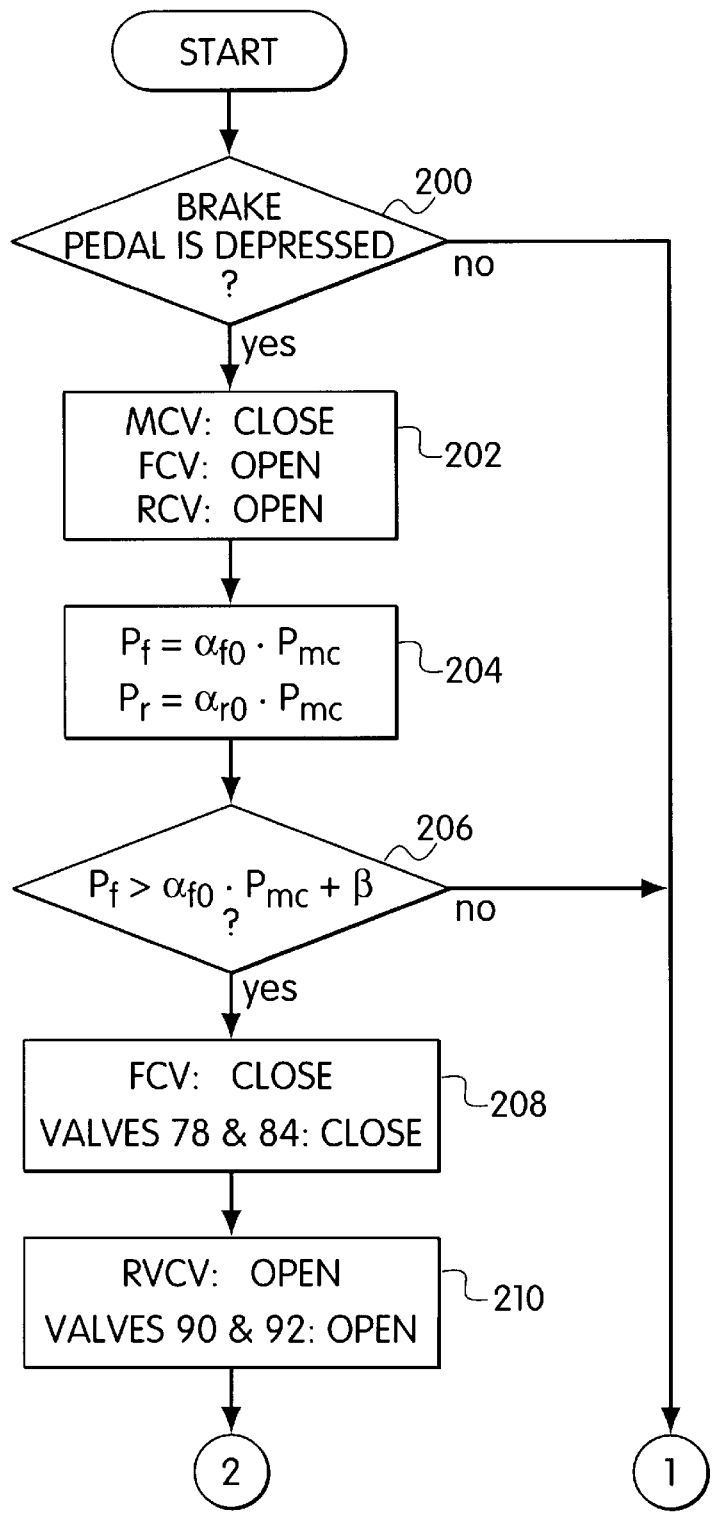
FIGS. 2A and 2B are a flowchart for explaining a control routine performed by a hydraulic brake control apparatus embodying the present invention.
Figure 2B:
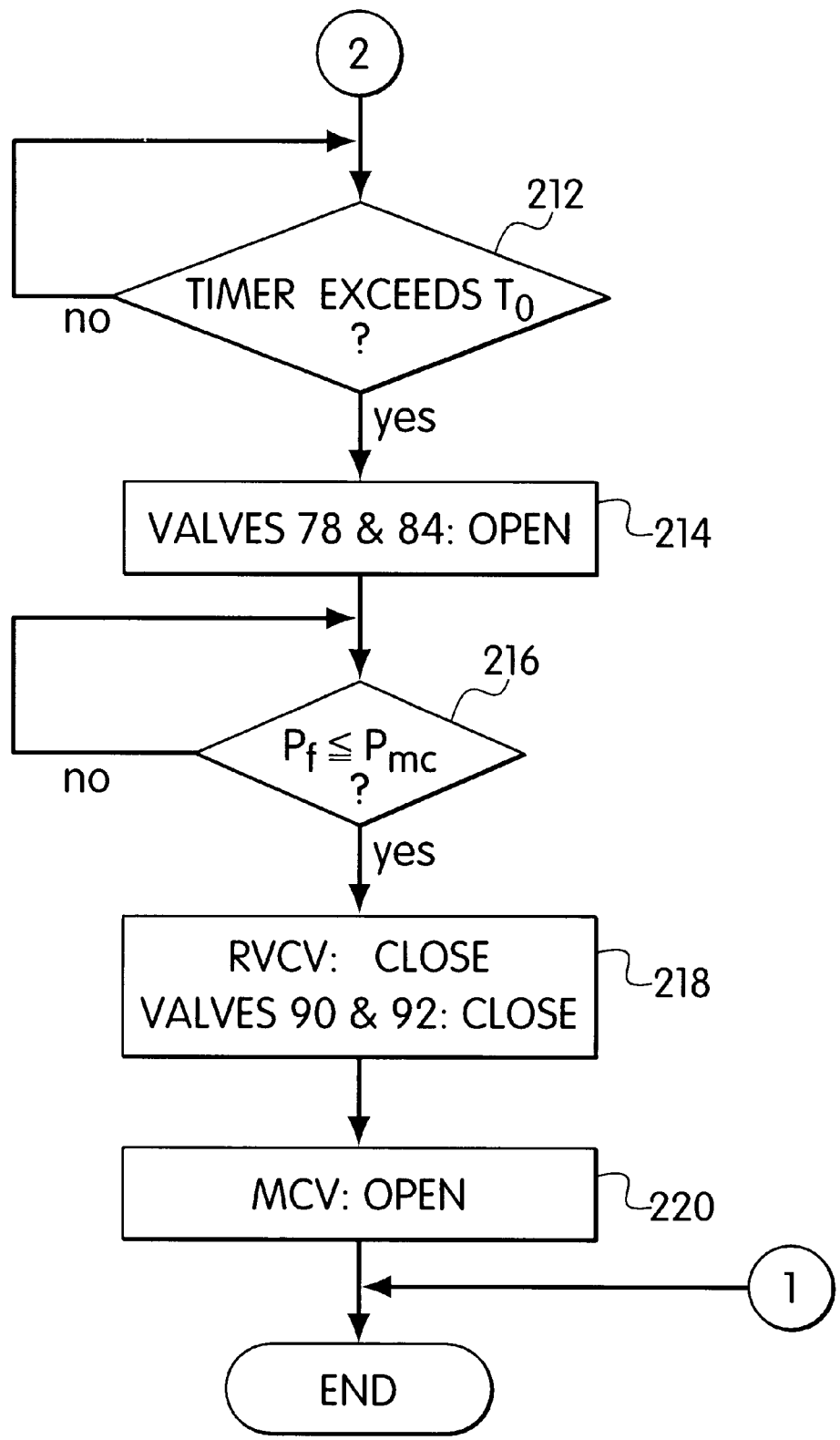

FIGS. 2A and 2B show a hydraulic brake control routine performed by a hydraulic brake control apparatus embodying the present invention. The control routine of FIGS. 2A and 2B is executed by the ECU 10 of the brake system of FIG. 1. The control routine of FIGS. 2A and 2B is executed in order to carry out the normal control mode when the high-pressure defect in the front linear valves 58 and 66 does not occur, and to carry out the above-mentioned function when the high-pressure defect in the front linear valves 58 and 66 has occurred.

As shown in FIG. 2A, the ECU 10 at step 200 detects whether the brake pedal 12 is depressed by the brake operating force by the vehicle operator. As described above, when the ON signal from the pressure switch 32 is supplied to the ECU 10 or when the pressure Pmc detected by the Pmc sensor 30 is higher than a reference level, it is detected that the brake pedal 12 is depressed by the brake operating force by the vehicle operator.

When the result at the step 200 is negative, the subsequent steps are not performed and the control routine of FIGS. 2A and 2B at the present cycle ends. When the result at the step 200 is affirmative, step 202 is executed by the ECU 10.

Step 202 sets the MCV 36 at the closed position, sets the FCV 70 at the opened position, and sets the RCV 100 at the opened position. This step is executed to carry out the normal control mode. After the step 202 is performed, step 204 is executed by the ECU 10.

Step 204 controls the front linear valves 58 and 66 such that the pressure Pf (detected by the Pf sensor 74) is supplied by the front linear valves 58 and 66 and a ratio of the pressure Pf to the pressure Pmc (detected by the Pmc sensor 30) is set at a predetermined constant $\alpha_{f0}$. Further, step 204 controls the rear linear valves 60 and 68 such that the pressure Pr (detected by the Pr sensor 98) is supplied by the rear linear valves 60 and 68 and a ratio of the pressure Pr to the pressure Pmc is set at a predetermined constant $\alpha_{r0}$. After the step 204 is performed, the equations Pf=$\alpha_{f0}$.Pmc and Pr=$\alpha_{r0}$.Pmc are satisfied.

In the above step 204, the brake fluid pressure Pf which is equal to the master cylinder pressure Pmc multiplied by the constant $\alpha_{f0}$, can be supplied to the wheel cylinders 82 and 88 provided for the front left (FL) wheel and the front right (FR) wheel of the vehicle. Further, the brake fluid pressure Pr which is equal to the master cylinder pressure Pmc multiplied by the constant $\alpha_{r0}$, can be supplied to the wheel cylinders 110 and 116 provided for the rear left (RL) wheel and the rear right (RR) wheel of the vehicle. Therefore, it is possible that the hydraulic brake control apparatus of the above-described embodiment safely produce an adequately great braking force on both the front wheels and the rear wheels of the vehicle, and the braking force thus produced is responsive to the brake operating force Fp. After the step 204 is performed, step 204 is performed, step 206 is executed by the ECU 10.

Step 206 makes a determination as to whether the high-pressure defect in the front linear valves 58 and 66 has occurred. More specifically, in the step 206, it is detected whether the pressure Pf detected by the Pf sensor 74 is higher than a sum of the expected supply pressure "$\alpha_{f0}$.Pmc" and a predetermined value "$\beta$".

When the condition at the step 206: Pf>$\alpha_{f0}$.Pmc+$\beta$ is not satisfied, it is determined that an appropriate level of the brake fluid pressure Pf is supplied to the wheel cylinders 82 and 88 by the front linear valves 58 and 66. Thus, when the result at the step 206 is negative, the control routine at the present cycle ends.

On the other hand, when the condition: Pf>$\alpha_{f0}$,Pmc+$\beta$ is satisfied, it is determined that the high-pressure defect in the front linear valves 58 and 66 has occurred. That is, the detected pressure Pf is excessively higher than the expected supply pressure "$\alpha_{f0}$.Pmc". Thus, when the result at the step 206 is affirmative, it is determined that the high-pressure defect in the front linear valves 58 and 66 has occurred. In this case, step 208 is executed by the ECU 10 in order to carry out a fail-safe function against the high-pressure defect in the front linear valves 58 and 66.

Step 208 sets the FCV 70 at the closed position and sets the pressure hold valves 78 and 84 at the closed positions. After the step 208 is performed, the supply of the brake fluid pressure from the front linear valves 58 and 66 to the front hydraulic circuit 72 is inhibited by the FCV 70 which is set at the closed position, and the connection passage 76 of the front hydraulic circuit 72 and the wheel cylinders 82 and 88 are separated from each other by the valves 78 and 84 which are set at the closed positions. After the step 208 is performed, step 210 is executed by the ECU 10.

Step 210 sets the RVCV 96 at the opened position and sets the pressure-down valves 90 and 92 at the opened positions. After the step 210 is performed, the flow of the brake fluid from the wheel cylinders 82 and 88 into the reservoir tank 28 through the RVCV 96 and the valves 90 and 92 is allowed. The brake fluid in the wheel cylinders 82 and 88 is set at a high pressure upon occurrence of the high-pressure defect in the front linear valves 58 and 66. Therefore, after the step 210 is performed, the brake fluid pressure Pwc in the wheel cylinders 82 and 88 is reduced to a low pressure which is approximately equal to the atmospheric pressure. After the step 210 is performed, step 212, shown in FIG. 2B, is executed by the ECU 10.

As described above, the check valve 38 allows the flow of the brake fluid from the pressure passage 34 to the pressure passage 40 through the bypass passage of the MCV 36. If the brake fluid pressure in the front hydraulic circuit 72 (or the pressure in the connection passage 76) is lower than the brake fluid pressure Pmc in the master cylinder 14 when the pressure in the wheel cylinders 82 and 88 is reduced, the brake fluid from the master cylinder 14 may flow into the front hydraulic circuit 72 through the bypass passage in which the check valve 38 is provided.

In the above-described steps 208 and 210, the connection passage 76 and the wheel cylinders 82 and 88 are separated from each other by the valves 78 and 84, and the brake fluid from the wheel cylinders 82 and 88 flows into the reservoir tank 28 through the RVCV 96 and the valves 90 and 92 so that the pressure in the wheel cylinders 82 and 88 is reduced. Therefore, after the step 210 is performed, it is possible to safely prevent the flow of the brake fluid from the master cylinder 14 into the front hydraulic circuit 72 through the bypass passage when the brake fluid from the wheel cylinders 82 and 88 flows into the reservoir tank 28 through the RVCV 96 and the valves 90 and 92.

As shown in FIG. 2B, step 212 detects whether the elapsed time counted by a timer (not shown) exceeds a predetermined time "To". The timer starts counting the elapsed time from the time the above step 210 is performed. The time "To" is preset to a period of time required for the pressure in the wheel cylinders 82 and 88, upon the occurrence of the high-pressure defect in the front linear valves 58 and 66, to be reduced to the low pressure which is approximately equal to the atmospheric pressure. The execution of the step 212 is repeated until the result at the step 212 is affirmative. When the result at the step 212 is affirmative, step 214 is executed by the ECU 10.

Step 214 sets the pressure hold valves 78 and 84 at the opened positions. After the step 214 is performed, the flow of the brake fluid from the connection passage 76 of the front hydraulic circuit 72 into the wheel cylinders 82 and 88 through the valves 78 and 84 is allowed. The flow of the brake fluid from the wheel cylinders 82 and 88 into the reservoir tank 28 through the RVCV 96 and the valves 90 and 92 is already allowed at the step 210. Therefore, after the step 214 is performed, the high-pressure brake fluid in the connection passage 76 flows into the reservoir tank 28 through the valves 78 and 84, so that the brake fluid pressure in the connection passage 76 is rapidly reduced. After the step 214 is performed, step 216 is executed by the ECU 10.

Step 216 detects whether the pressure Pf detected by the Pf sensor 74 after the reduction of the brake fluid pressure in the connection passage 76 in the step 214 is lower than the master cylinder pressure Pmc detected by the Pmc sensor 30. The execution of the step 216 is repeated until the result at the step 216 is affirmative. When the result at the step 216 is affirmative, step 218 is executed by the ECU 10.

Step 218 sets the RVCV 96 at the closed position and sets the pressure-down valves 90 and 92 at the closed positions. After the step 218 is performed, the front hydraulic circuit 72 and the reservoir tank 28 are separated from each other by the RVCV 96 and the valves 90 and 92. After the step 218 is performed, step 220 is executed by the ECU 10.

Step 220 sets the MCV 36 at the opened position. When the MCV 36 is set at the opened position, the flow of the brake fluid between the MCV 36 and the wheel cylinders 82 and 88 is allowed. Before the step 216 is performed, it is already detected that the brake fluid pressure Pf in the connection passage 76 is lower than the master cylinder pressure Pmc in the master cylinder 14. Therefore, it is possible to safely prevent the counter flow of the brake fluid from the front hydraulic circuit 72 into the master cylinder 14 after the step 220 is performed.

After the step 220 is performed, it is possible to produce a wheel cylinder pressure in the wheel cylinders 82 and 88 which is substantially equal to the master cylinder pressure Pmc in the master cylinder 14. After the step 220 is performed, the control routine of FIGS. 2A and 2B at the present cycle ends.

According to the hydraulic brake control apparatus in the embodiment of FIGS. 2A and 2B, when the high-pressure defect in the front linear valves 58 and 66 has occurred, the supply of the brake fluid pressure to the wheel cylinders 82 and 88 by the front linear valves 58 and 66 is changed to the supply of the brake fluid pressure to the wheel cylinders 82 and 88 by the master cylinder 14 without producing the counter flow of the brake fluid into the master cylinder 14. The pressure reduction device, used by the conventional apparatus of the above-mentioned publication, is not used by the hydraulic brake control apparatus in the present embodiment. Therefore, according to the above-described hydraulic brake control apparatus, it is possible to provide the fail-safe function against the high-pressure defect in the front linear valves 58 and 66 with a low cost and assure the durability of the master cylinder 14.

In the above embodiment of FIGS. 2A and 2B, before the supply of the brake fluid pressure to the wheel cylinders 82 and 88 by the linear valves 58 and 66 is changed to the supply of the brake fluid pressure to the wheel cylinders 82 and 88 by the master cylinder 14, the brake fluid pressure in the wheel cylinders 82 and 88 is reduced while the connection passage 76 and the wheel cylinders 82 and 88 are separated from each other. After the brake fluid pressure in the wheel cylinders 82 and 88 is reduced, the brake fluid pressure Pf in the connection passage 76 is reduced, and, then, the supply of the brake fluid pressure to the wheel cylinders 82 and 88 by the linear valves 58 and 66 is changed to the supply of the brake fluid pressure to the wheel cylinders 82 and 88 by the master cylinder 14. According to the above-described embodiment, when the high-pressure defect in the front linear valves 58 and 66 has occurred, it is possible to safely prevent the counter flow of the high-pressure brake fluid from the wheel cylinders 82 and 88 into the master cylinder 14, which is detrimental to the durability of the master cylinder 14.

However, the method of reducing the brake fluid pressure in the wheel cylinders 82 and 88 is not limited to the above-described embodiment. Alternatively, the brake fluid pressure in the wheel cylinders 82 and 88 may be reduced without separating the connection passage 76 from the wheel cylinders 82 and 88.

According to the alternative method, the reduction of the brake fluid pressure in the wheel cylinders 82 and 88 is stopped when the brake fluid pressure Pf detected by the Pf sensor 74 is made equal to the pressure Pmc detected by the Pmc sensor 30, and, then, the supply of the brake fluid pressure to the wheel cylinders 82 and 88 by the linear valves 58 and 66 is changed to the supply of the brake fluid pressure to the wheel cylinders 82 and 88 by the master cylinder 14. According to the alternative method, it is also possible to safely prevent the high-pressure brake fluid from the wheel cylinders 82 and 88 from being returned back to the master cylinder 14 through the MCV 36.

Figure 3A:
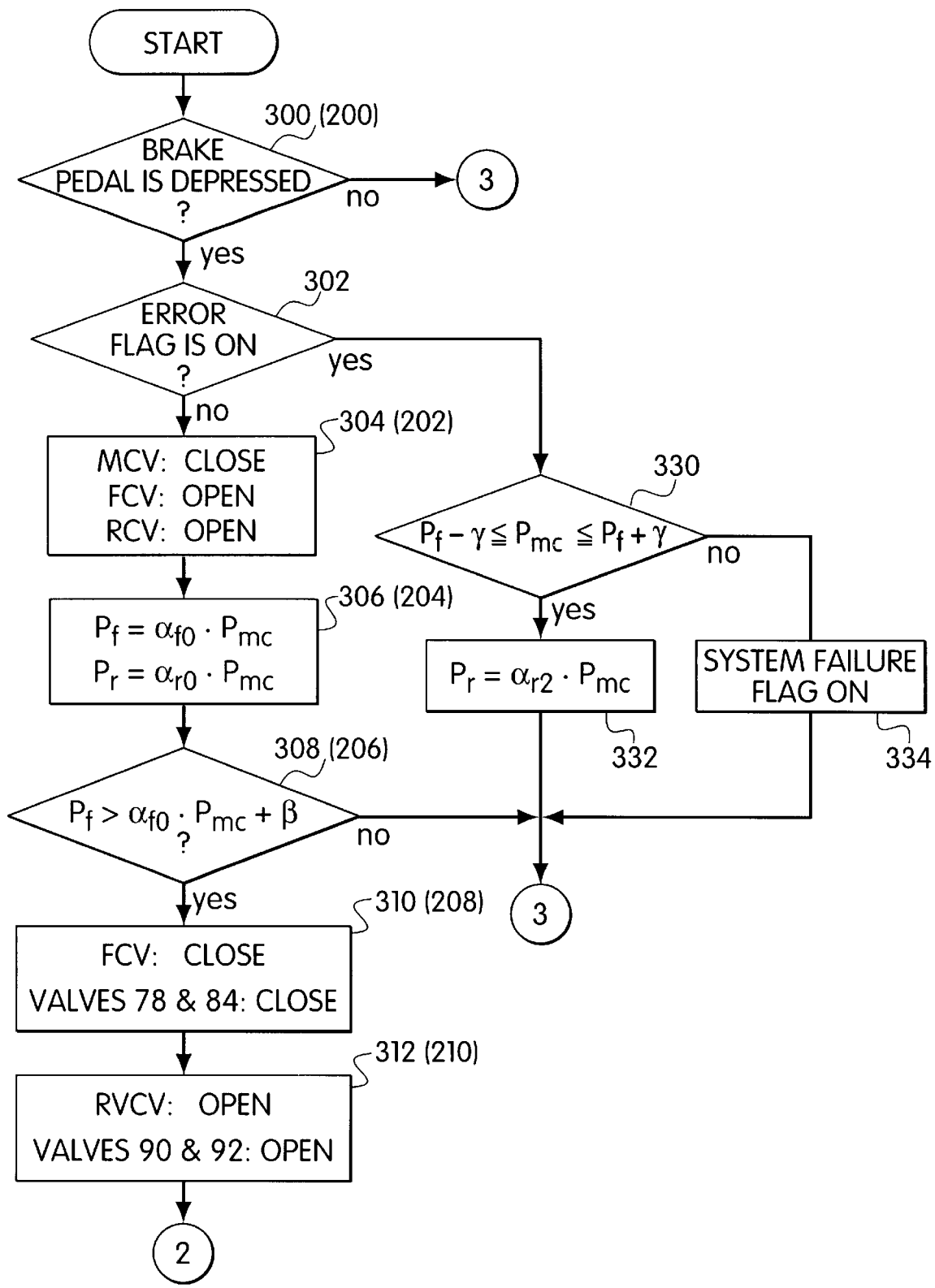
FIGS. 3A and 3B are a flowchart for explaining another control routine performed by the hydraulic brake control apparatus embodying the present invention.
Figure 3B:
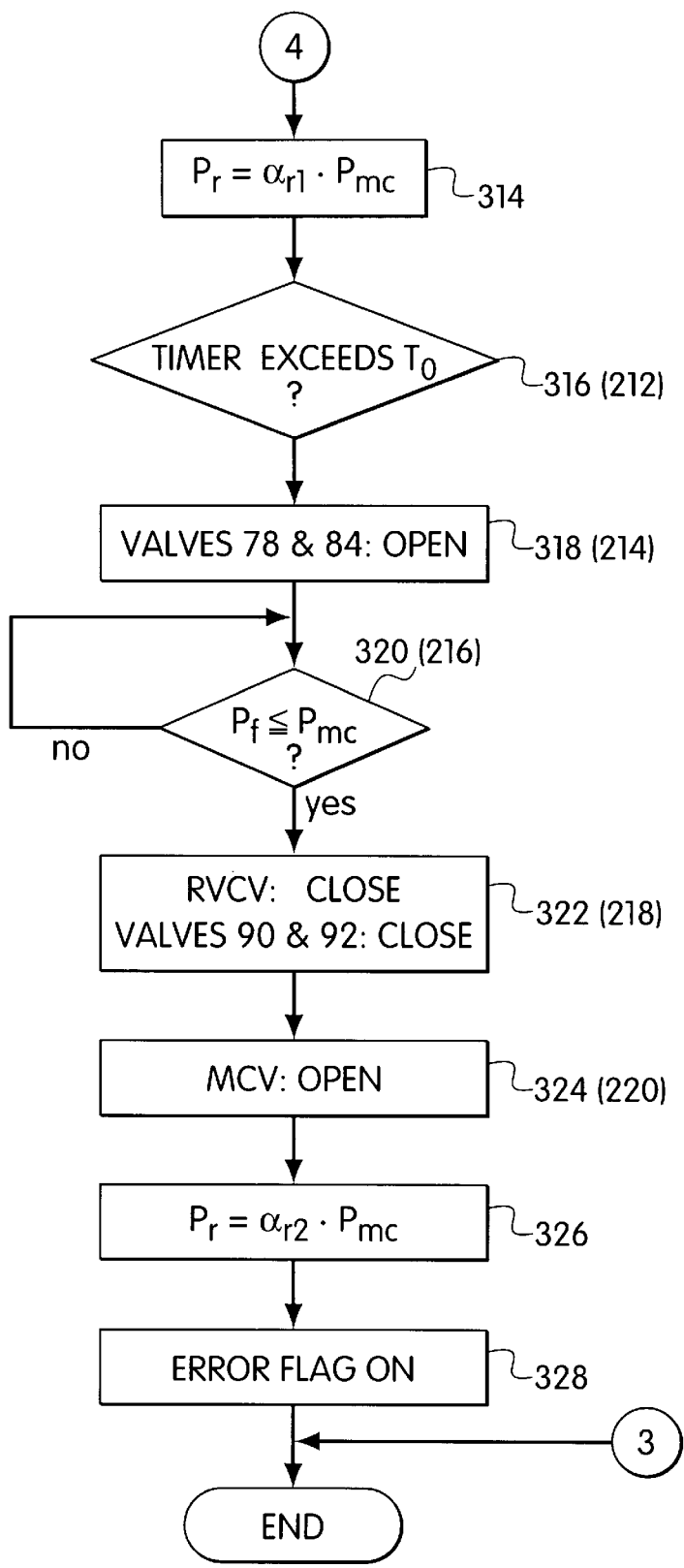

FIGS. 3A and 3B show another hydraulic brake control routine performed by the hydraulic brake control apparatus embodying the present invention.

Instead of the control routine of FIGS. 2A and 2B, the control routine of FIGS. 3A and 3B is executed by the ECU 10 of the brake system according to the present embodiment. The control routine of FIGS. 3A and 3B is executed in order to carry out the normal control mode when the high-pressure defect in the front linear valves 58 and 66 does not occur, and to carry out the above-mentioned function when the high-pressure defect in the front linear valves 58 and 66 has occurred.

In the control routine of FIGS. 2A and 2B, the wheel cylinder pressure Pwc in the wheel cylinders 82 and 88 is reduced to a low pressure approximately equal to the atmospheric pressure before the supply of the brake fluid pressure to the wheel cylinders 82 and 88 by the front linear valves 58 and 66 is changed to the supply of the brake fluid pressure to the wheel cylinders 82 and 88 by the master cylinder 14. If the wheel cylinder pressure Pwc in the wheel cylinders 82 and 88 is reduced to a low pressure near the atmospheric pressure, an adequately great braking force is hardly produced on the FL and FR wheels by the wheel cylinders 82 and 88. Therefore, before the supply of the brake fluid pressure to the wheel cylinders 82 and 88 by the front linear valves 58 and 66 is changed to the supply of the brake fluid pressure to the wheel cylinders 82 and 88 by the master cylinder 14, the hydraulic brake control apparatus of the embodiment of FIGS. 2A and 2B is temporarily in a condition in which an adequately great brake force can be produced on only the RL and RR wheels by the wheel cylinders 110 and 116 and an adequately great braking force cannot be produced on the FL and FR wheels by the wheel cylinders 82 and 88.

Further, in the control routine of FIGS. 2A and 2B, when the supply of the brake fluid to the wheel cylinders 82 and 88 is performed by the front linear valves 58 and 66, the normal control mode is carried out so that the wheel cylinder pressure Pwc in the wheel cylinders 82 and 88 is set at a pressure equal to the master cylinder pressure Pmc multiplied by the predetermined constant. After the supply of the brake fluid pressure to the wheel cylinders 82 and 88 by the front linear valves 58 and 66 is changed to the supply of the brake fluid pressure to the wheel cylinders 82 and 88 by the master cylinder 14 upon occurrence of the high-pressure defect in the front linear valves 58 and 66, the wheel cylinder pressure Pwc in the wheel cylinders 82 and 88 is set to be equal to the master cylinder pressure Pmc by the supply of the brake fluid pressure to the wheel cylinders 82 and 88 by the master cylinder 14. The hydraulic brake control apparatus of the embodiment of FIGS. 2A and 2B at this time is in a condition in which a braking force which is the same as the braking force during the normal control mode cannot be produced on the FL and FR wheels by the wheel cylinders 82 and 88.

Accordingly, in the control routine of FIGS. 2A and 2B, the braking force produced on the vehicle wheels by the wheel cylinders may be considerably reduced before and after the supply of the brake fluid pressure to the wheel cylinders 82 and 88 by the front linear valves 58 and 66 is changed to the supply of the brake fluid pressure to the wheel cylinders 82 and 88 by the master cylinder 14 upon occurrence of the high-pressure defect in the front linear valves 58 and 66.

An important function of the hydraulic brake control apparatus in the embodiment of FIGS. 3A and 3B is to effectively prevent the above-described reduction of the braking force on the vehicle wheels by the wheel cylinders in the course of the change from the supply of the brake fluid pressure by the front linear valves 58 and 66 to the supply of the brake fluid pressure by the master cylinder 14 upon occurrence of the high-pressure defect in the front linear valves 58 and 66. The control routine of FIGS. 3A and 3B is executed in order to carry out the normal control mode when the high-pressure defect in the front linear valves 58 and 66 does not occur, and to carry out the above-described function when the high-pressure defect in the front linear valves 58 and 66 has occurred.

In FIGS. 3A and 3B, the steps which are the same as corresponding steps of FIGS. 2A and 2B are indicated by the same reference numerals in parentheses which are attached to corresponding reference numerals of FIGS. 3A and 3B, and a description thereof will be omitted or simplified.

As shown in FIG. 3A, the ECU 10 at step 300 detects whether the brake pedal 12 is depressed by the brake operating force.

When the result at the step 300 is negative, the subsequent steps are not performed and the control routine of FIGS. 3A and 3B at the present cycle ends. When the result at the step 300 is affirmative, step 302 is executed by the ECU 10.

Step 302 detects whether an error flag (which will be described later) is in an ON state. The error flag is set in the ON state when it is detected that the high-pressure defect in the front linear valves 58 and 66 has occurred. Otherwise the error flag is set in an OFF state. If it is detected at the preceding cycle of the control routine that the high-pressure defect in the front linear valves 58 and 66 does not occur, the error flag is not in the ON state. When the result at the step 302 is negative, step 304 and the subsequent steps are executed by the ECU 10.

Step 304 sets the MCV 36 at the closed position, sets the FCV 70 at the opened position, and sets the RCV 100 at the opened position. This step is executed to carry out the normal control mode. Step 306 controls the front linear valves 58 and 66 such that the pressure Pf (detected by the Pf sensor 74) is supplied by the front linear valves 58 and 66 and the ratio of the pressure Pf to the pressure Pmc (detected by the Pmc sensor 30) is set at the predetermined constant $\alpha_{f0}$. Further, step 306 controls the rear linear valves 60 and 68 such that the pressure Pr (detected by the Pr sensor 98) is supplied by the rear linear valves 60 and 68 and the ratio of the pressure Pr to the pressure Pmc is set at the predetermined constant $\alpha_{r0}$. After the step 306 is performed, the equations Pf=$\alpha_{f0}$.Pmc and Pr=$\alpha_{r0}$.Pmc are satisfied.

Step 308 makes a determination as to whether the high-pressure defect in the front linear valves 58 and 66 has occurred. More specifically, in the step 308, it is detected whether the pressure Pf detected by the Pf sensor 74 is higher than the sum of the expected supply pressure "$\alpha_{f0}$.Pmc" and the predetermined value "$\beta$".

When the condition at the step 308: Pf>$\alpha_{f0}$.Pmc+$\beta$ is not satisfied, it is determined that an appropriate level of the brake fluid pressure Pf is supplied to the wheel cylinders 82 and 88 by the front linear valves 58 and 66. At this time, the result at the step 308 is negative, and the control routine at the present cycle ends.

When the condition at the step 308: Pf>$\alpha_{f0}$.Pmc+$\beta$ is satisfied, it is determined that the high-pressure defect in the front linear valves 58 and 66 has occurred. That is, the detected pressure Pf is excessively higher than the expected supply pressure "$\alpha_{f0}$.Pmc". At this time, the result at the step 308 is affirmative, and step 310 and subsequent steps are executed in order to carry out the fail-safe function against the high-pressure defect in the front linear valves 58 and 66.

Step 310 sets the FCV 70 at the closed position and sets the pressure hold valves 78 and 84 at the closed positions. After the step 310 is performed, the supply of the brake fluid pressure from the front linear valves 58 and 66 to the front hydraulic circuit 72 is inhibited by the FCV 70 which is set at the closed position, and the connection passage 76 of the front hydraulic circuit 72 and the wheel cylinders 82 and 88 are separated from each other by the valves 78 and 84 which are set at the closed positions.

Step 312 sets the RVCV 96 at the opened position and sets the pressure-down valves 90 and 92 at the opened positions. After the step 312 is performed, the flow of the brake fluid from the wheel cylinders 82 and 88 into the reservoir tank 28 through the RVCV 96 and the valves 90 and 92 is allowed. Therefore, the brake fluid pressure Pwc in the wheel cylinders 82 and 88 is reduced to a low pressure which is approximately equal to the atmospheric pressure. After the step 312 is performed, step 314, shown in FIG. 3B, is executed by the ECU 10.

As shown in FIG. 3B, step 314 controls the rear linear valves 60 and 68 such that the pressure Pr (detected by the Pr sensor 98) is supplied by the rear linear valves 60 and 68 and a ratio of the pressure Pr to the pressure Pmc (detected by the Pmc sensor 30) is set at a predetermined constant $\alpha_{r1}$. The constant $\alpha_{r1}$ used by the step 314 is greater than the constant $\alpha_{r0}$ used by the step 306 during the normal control mode ($\alpha_{r0} < \alpha_{r1}$). Therefore, after the step 314 is performed, the brake fluid pressure Pwc which is higher than the brake fluid pressure Pwc produced during the normal control mode can be produced in the rear wheel cylinders 110 and 116 for the RL and RR wheels of the vehicle.

Therefore, according to the embodiment of FIGS. 3A and 3B, the braking force greater than the braking force produced during the normal control mode can be produced by the rear wheel cylinders 110 and 116 before the supply of the brake fluid pressure to the wheel cylinders 82 and 88 by the front linear valves 58 and 66 is changed to the supply of the brake fluid pressure to the wheel cylinders 82 and 88 by the master cylinder 14 upon occurrence of the high-pressure defect in the front linear valves 58 and 66. It is possible for the embodiment of FIGS. 3A and 3B to effectively prevent the above-described reduction of the braking force on the vehicle wheels by the wheel cylinders in the course of the reduction of the brake fluid pressure Pwc in the wheel cylinders 82 and 88 after the occurrence of the high-pressure defect in the front linear valves 58 and 66 is detected. After the step 314 is performed, step 316 and the subsequent steps are executed by the ECU 10.

Step 316 detects whether the elapsed time counted by the timer exceeds the predetermined time "To". The timer starts counting the elapsed time from the time the above step 314 is performed. The time "To" is preset to a period of time required for the brake fluid pressure Pwc in the wheel cylinders 82 and 88, upon the occurrence of the high-pressure defect in the front linear valves 58 and 66, to be reduced to the low pressure which is approximately equal to the atmospheric pressure. The execution of the step 316 is repeated until the result at the step 316 is affirmative. When the result at the step 316 is affirmative, step 318 is executed by the ECU 10.

Step 318 sets the pressure hold valves 78 and 84 at the opened positions. After the step 318 is performed, the flow of the brake fluid from the connection passage 76 of the front hydraulic circuit 72 into the wheel cylinders 82 and 88 through the valves 78 and 84 is allowed. The flow of the brake fluid from the wheel cylinders 82 and 88 into the reservoir tank 28 through the RVCV 96 and the valves 90 and 92 is already allowed at the step 312. Therefore, after the step 318 is performed, the high-pressure brake fluid in the connection passage 76 flows into the reservoir tank 28 through the valves 78 and 84, so that the brake fluid pressure in the connection passage 76 is rapidly reduced.

Step 320 detects whether the pressure Pf detected by the Pf sensor 74 after the reduction of the brake fluid pressure in the connection passage 76 in the step 318 is lower than the master cylinder pressure Pmc detected by the Pmc sensor 30. The execution of the step 320 is repeated until the result at the step 320 is affirmative. When the result at the step 320 is affirmative, step 322 is executed by the ECU 10.

Step 322 sets the RVCV 96 at the closed position and sets the pressure-down valves 90 and 92 at the closed positions. After the step 322 is performed, the front hydraulic circuit 72 and the reservoir tank 28 are separated from each other by the RVCV 96 and the valves 90 and 92.

Step 324 sets the MCV 36 at the opened position. When the MCV 36 is set at the opened position, the flow of the brake fluid between the MCV 36 and the wheel cylinders 82 and 88 is allowed. Before the step 324 is performed, it is detected that the brake fluid pressure Pf in the connection passage 76 is lower than the master cylinder pressure Pmc in the master cylinder 14. It is possible to safely prevent the counter flow of the brake fluid from the front hydraulic circuit 72 into the master cylinder 14 after the step 324 is performed. After the step 324 is performed, step 326 is executed by the ECU 10.

Step 326 controls the rear control valves 60 and 68 such that the pressure Pr (detected by the Pr sensor 98) is supplied by the rear linear valves 60 and 68 and a ratio of the pressure Pr to the pressure Pmc (detected by the Pmc sensor 30) is set at a predetermined constant $\alpha_{r2}$. The constant $\alpha_{r2}$ used by the step 326 is greater than the constant $\alpha_{r0}$ used by the step 306 during the normal control mode and smaller than the constant $\alpha_{r1}$ used by the step 314 during the reduction of the brake fluid pressure Pwc ($\alpha_{r0} < \alpha_{r2} < \alpha_{r1}$). Therefore, after the step 326 is performed, the brake fluid pressure Pwc which is higher than the brake fluid pressure Pwc produced during the normal control mode and lower than the brake fluid pressure Pwc produced during the reduction of the brake fluid pressure Pwc can be produced in the rear wheel cylinders 110 and 116 for the RL and RR wheels of the vehicle.

Therefore, according to the embodiment of FIGS. 3A and 3B, the braking force which is greater than the braking force produced during the normal control mode and smaller than the braking force produced during the reduction of the brake fluid pressure Pwc can be produced by the rear wheel cylinders 110 and 116 after the supply of the brake fluid pressure to the wheel cylinders 82 and 88 by the front linear valves 58 and 66 is changed to the supply of the brake fluid pressure to the wheel cylinders 82 and 88 by the master cylinder 14 upon occurrence of the high-pressure defect in the front linear valves 58 and 66. It is possible for the embodiment of FIGS. 3A and 3B to effectively prevent the above-described reduction of the braking force on the vehicle wheels by the wheel cylinders after the supply of the brake fluid pressure by the front linear valves 58 and 66 is changed to the supply of the brake fluid pressure by the master cylinder 14 when the occurrence of the high-pressure defect in the front linear valves 58 and 66 is detected. After the step 326 is performed, step 328 is executed by the ECU 10.

Step 328 sets the error flag in the ON state, which indicates that the high-pressure defect in the front linear valves 58 and 66 has occurred. After the step 328 is performed, the control routine of FIGS. 3A and 3B at the present cycle ends.

If the error flag is set in the ON state by the step 328, the result at the step 302 during the execution of the control routine at the following cycle is affirmative. When the result at the step 302 is affirmative, step 330 is executed by the ECU 10.

Step 330 detects whether the pressure Pmc (detected by the Pmc sensor 30) is higher than a pressure (Pf−τ) and lower than a pressure (Pf+τ) where Pf is the pressure detected by the Pf sensor 74 and τ is a predetermined value. The predetermined value τ is given by taking into account measurement errors and tolerances of the Pmc sensor 30 and the Pf sensor 74. When the condition at the step 330: (Pf−τ)≦Pmc≦(Pf+τ) is satisfied, it is determined that the brake fluid pressure Pwc in the wheel cylinders 82 and 88 is increased to a proper pressure by the supply of the brake fluid pressure by the master cylinder 14. At this time, the result at the step 330 is affirmative, and step 332 is executed by the ECU 10.

Step 332 controls the rear control valves 60 and 68 such that the pressure Pr (detected by the Pr sensor 98) is supplied by the rear linear valves 60 and 68 and the ratio of the pressure Pr to the pressure Pmc (detected by the Pmc sensor 30) is set at the predetermined constant $\alpha_{r2}$. The step 332 is similar to the step 326. Therefore, after the step 332 is performed, the braking force which is greater than the braking force produced during the normal control mode can be produced by the rear wheel cylinders 110 and 116 after the supply of the brake fluid pressure to the wheel cylinders 82 and 88 by the front linear valves 58 and 66 is changed to the supply of the brake fluid pressure to the wheel cylinders 82 and 88 by the master cylinder 14 upon occurrence of the high-pressure defect in the front linear valves 58 and 66. After the step 322 is performed, the control routine of FIGS. 3A and 3B at the present cycle ends.

On the other hand, when the result at the step 330 is negative, it is determined that the brake fluid pressure Pwc in the wheel cylinders 82 and 88 is not increased to a proper pressure by the supply of the brake fluid pressure by the master cylinder 14. Therefore, it is determined that another defect, other than the high-pressure defect in the front linear valves 58, has occurred in the brake system. At this time, step 334 is executed by the ECU 10.

Step 334 sets a system failure flag in an ON state, which indicates that another defect in the brake system has occurred. After the step 334 is performed, the control routine of FIGS. 3A and 3B at the present cycle ends.

According to the hydraulic brake control apparatus in the embodiment of FIGS. 3A and 3B, when the high-pressure defect in the front linear valves 58 and 66 has occurred, the supply of the brake fluid pressure to the wheel cylinders 82 and 88 by the front linear valves 58 and 66 is changed to the supply of the brake fluid pressure to the wheel cylinders 82 and 88 by the master cylinder 14 without producing the counter flow of the brake fluid into the master cylinder 14. Therefore, according to the above-described hydraulic brake control apparatus, it is possible to provide the fail-safe function against the high-pressure defect in the front linear valves 58 and 66 and assure the durability of the master cylinder 14.

In addition, according to the hydraulic brake control apparatus in the embodiment of FIGS. 3A and 3B, it is possible to effectively prevent the above-described reduction of the braking force on the vehicle wheels by the wheel cylinders in the course of the change from the supply of the brake fluid pressure by the front linear valves 58 and 66 to the supply of the brake fluid pressure by the master cylinder 14 upon occurrence of the high-pressure defect in the front linear valves 58 and 66. Therefore, the above-described hydraulic brake control apparatus enables the brake system to maintain an adequately great brake force on the vehicle wheels even when the high-pressure defect in the front linear valves 58 and 66 has occurred.

Further, the present invention is not limited to the above-described embodiments, and variations and modifications may be made without departing from the present invention.

What is claimed is:

1. A hydraulic brake control apparatus for preventing a counterflow of brake fluid into a master cylinder when a supply brake pressure is excessive, the master cylinder supplying to at least one wheel cylinder via at least one first valve a brake fluid pressure responsive to a brake operating force, a pressure supplying device supplies a brake fluid pressure responsive to a drive signal to the at least one wheel cylinder through at least one second valve, and the at least one wheel cylinder is connected to a reservoir tank via at least one third valve, the apparatus comprising:

a control unit for controlling the at least one first, second and third valves, wherein, when the brake fluid pressure supplied by the pressure supplying device to the at least one wheel cylinder is excessively high and the supply of brake fluid pressure to the at least one wheel cylinder by the master cylinder is inhibited by the at least one first valve, the control unit controls the at least one second valve to inhibit the supply of the brake fluid pressure to the at least one wheel cylinder by the pressure supplying device and controls the at least one third valve to allow a flow of brake fluid from the at least one wheel cylinder into the reservoir tank and wherein, at a predetermined time after the at least one third valve is controlled to allow the flow of brake fluid from the at least one wheel cylinder into the reservoir tank, the control unit controls the at least one third valve to inhibit the flow of brake fluid from the at least one wheel cylinder into the reservoir tank and controls the at least one first valve to allow the supply of the brake fluid pressure to the at least one wheel cylinder by the master cylinder.

2. The hydraulic brake control apparatus according to claim 1, wherein the at least one wheel cylinder includes a first wheel cylinder and a second wheel cylinder, and the pressure supplying device comprises a first pressure supplying unit which supplies a brake fluid pressure to the first wheel cylinder, and a second pressure supplying unit which supplies a brake fluid pressure to the second wheel cylinder.

3. The hydraulic brake control apparatus according to claim 2, wherein the at least one second valve comprises a first cut valve and a second cut valve, the first cut valve being capable of inhibiting the supply of the brake fluid pressure to the first wheel cylinder by the first pressure supplying unit, the second cut valve being capable of inhibiting the supply of the brake fluid pressure to the second wheel cylinder by the second pressure supplying unit, wherein the at least one third valve comprises a first pressure-down valve and a second pressure-down valve, the first pressure-down valve being capable of allowing brake fluid to flow from the first wheel cylinder into the reservoir tank and the second pressure-down valve being capable of allowing brake fluid to flow from the second wheel cylinder into the reservoir tank, and wherein the control unit controls the first and second cut valves and the first and second pressure-down valves, such that the supply of the brake fluid pressure to the first wheel cylinder by the first pressure supplying unit is controlled independently of the supply of the brake fluid pressure to the second wheel cylinder by the second pressure supplying unit.

4. The hydraulic brake control apparatus according to claim 3, wherein, when the control unit allows a flow of brake fluid into the reservoir tank from one of the first and second wheel cylinders, the flow being related to the one of the first and second pressure supplying units corresponding to the other of the first and second wheel cylinders, the control unit controls one of the first and second pressure supplying units so that an increased brake fluid pressure higher than a brake fluid pressure during a normal control mode is supplied to the other of the first and second wheel cylinders by the one of the first and second pressure supplying units.

5. The hydraulic brake control apparatus according to claim 3, wherein, when the brake fluid pressure supplied to one of the first and second wheel cylinders by the other of the first and second pressure supplying units is detected to be excessively high, the control unit controls one of the first and second pressure supplying units so that an increased brake fluid pressure higher than a brake fluid pressure during a normal control mode is supplied to the other of the first and second wheel cylinders by the one of the first and second pressure supplying units.

6. The hydraulic brake control apparatus according to claim 1, wherein the at least one first valve comprises a flow control valve provided between the master cylinder and the at least one wheel cylinder, the flow control valve being set at one of an opened position and a closed position.

7. The hydraulic brake control apparatus according to claim 1, wherein the at least one second valve comprises a flow control valve provided between the pressure supplying device and the at least one wheel cylinder, the flow control valve being set at one of an opened position and a closed position.

8. The hydraulic brake control apparatus according to claim 1, wherein the at least one wheel cylinders includes a first wheel cylinder and a second wheel cylinder, and the pressure supplying device comprises a first pressure supplying unit which supplies a brake fluid pressure to the first wheel cylinder, and a second pressure supplying unit which supplies a brake fluid pressure to the second wheel cylinder and wherein the at least one second valve comprises a first cut valve provided between the first pressure supplying unit and the first wheel cylinder and a second cut valve provided between the second pressure supplying unit and the second wheel cylinder, each of the first cut valve and the second cut valve being capable of being set at one of an opened position and a closed position independently of one another.

9. The hydraulic brake control apparatus according to claim 1, wherein the pressure supplying device comprises a linear valve connected to a pump provided with an actuating motor and the at least one second valve comprises a cut valve provided between the linear valve and the at least one wheel cylinder, the linear valve being capable of supplying a brake fluid pressure responsive to a drive signal to the at least one wheel cylinder, the cut valve being capable of being set to one of an opened position and a closed position.

10. The hydraulic brake control apparatus according to claim 1, wherein the at least one third valve comprises a cut valve provided between the at least one wheel cylinder and the reservoir tank, the cut valve being capable of being set to one of an opened position and a closed position.

* * * * *

UNITED STATES PATENT AND TRADEMARK OFFICE
CERTIFICATE OF CORRECTION

PATENT NO. : 5,992,949
DATED : November 30, 1999
INVENTOR(S) : Kiyoharu NAKAMURA, et al.

It is certified that error appears in the above-identified patent and that said Letters Patent is hereby corrected as shown below:

Column 24, line 2, change "cylinders" to --cylinder--.

Signed and Sealed this

Twenty-ninth Day of May, 2001

Attest:

NICHOLAS P. GODICI

*Attesting Officer*   *Acting Director of the United States Patent and Trademark Office*